United States Patent [19]

Johnson, Sr.

[11] 4,419,843

[45] Dec. 13, 1983

[54] SELF-IRRIGATING, MULTI-TIER VERTICAL PLANTER

[76] Inventor: Hugh A. Johnson, Sr., P.O. Box 125, Lakeview, Mich. 48850

[21] Appl. No.: 389,966

[22] Filed: Jun. 18, 1982

Related U.S. Application Data

[63] Continuation-in-part of Ser. No. 245,716, Mar. 20, 1981.

[51] Int. Cl.³ ............................................. A01G 25/00
[52] U.S. Cl. ...................................................... 47/82
[58] Field of Search ..................... 47/39, 48.5, 66, 67, 47/79, 82, 83

[56] References Cited

U.S. PATENT DOCUMENTS

| | | | |
|---|---|---|---|
| 96,144 | 10/1869 | Putnam | 47/83 |
| 283,840 | 8/1883 | Westphal | 47/39 |
| 706,821 | 8/1902 | Hart | 47/83 |
| 1,453,401 | 5/1923 | Mattson | 47/79 X |
| 2,375,860 | 5/1945 | Markham | 47/48.5 |
| 3,293,798 | 12/1966 | Johnson | 47/83 |
| 3,452,475 | 7/1969 | Johnson | 47/79 |
| 4,295,296 | 10/1981 | Kinghorn | 47/82 |

FOREIGN PATENT DOCUMENTS

| | | | |
|---|---|---|---|
| 15082 | 7/1901 | United Kingdom | 47/83 |

*Primary Examiner*—James R. Feyrer
*Attorney, Agent, or Firm*—Berman, Aisenberg & Platt

[57] ABSTRACT

The invention is a new structure for a self-irrigating, multi-tiered planter. The planter has a pan-shaped base to receive water, and a centrally mounted, upstanding tubular post member, open on its lower end, and secured to the base, and having a plurality of apertures in its side walls. A plurality of vertically stacked trays which are shaped as a V in rotation, for containing soil are vertically stacked on the tubular post member. The trays are vertically aligned over the pan-shaped base member. Each tray has apertures in the lowest point of the V to allow liquid to seep into a lower tray and finally into the base member. Each tray has a plurality of second apertures located in the outer inclined wall of each tray to provide an overflow outlet for excess liquid to drip into a lower tray. The planter has a liquid distribution system located above the uppermost tray and an apparatus to feed liquid to the distribution apparatus.

Another embodiment includes trays which contain organic soil in an outer annular portion, and an inorganic material, such as gravel, in an inner annular portion. The trays are not supported by the central post, but instead rest upon each other. The central post provides air circulation to prevent the soil from becoming sour.

16 Claims, 3 Drawing Figures

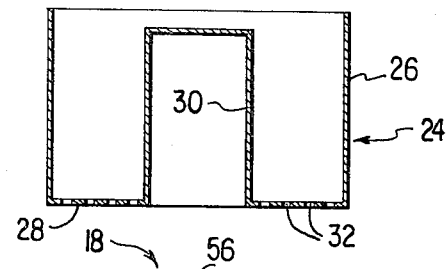
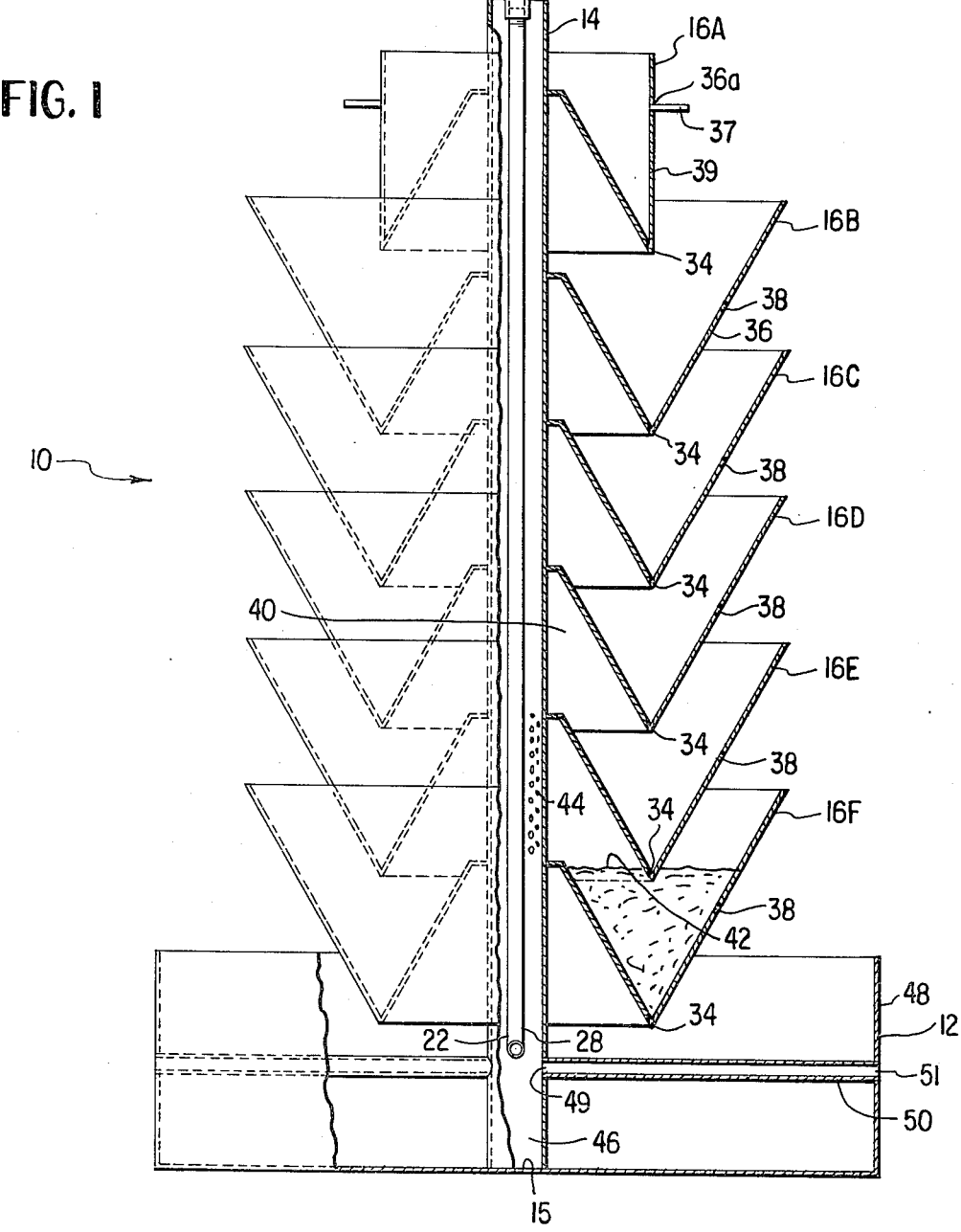

SELF-IRRIGATING, MULTI-TIER VERTICAL PLANTER

CROSS-REFERENCE

This application is a continuation-in-part of Application Ser. No. 245,716 filed Mar. 20, 1981.

FIELD OF THE INVENTION

This invention relates to self-irrigating planters for growing plants on limited ground space.

BACKGROUND ART

The prior art shows a variety of devices having vertically arrayed containers of soil for growing plants.

In U.S. Pat. No. 3,452,475 ussued to Hugh A. Johnson, Sr. on July 1, 1969, is shown a self-irrigating, multi-tiered planter to allow increased crop growing space in a limited amount of ground area. The Johnson '475 patent discloses a vertical array of circular planter tiers mounted on a common pole, each tier having a concentric, vertical divider screen 29 dividing each tier into two concentric, annular portions. The outer portion contains soil for growing plants and the inner portion is a basin for collecting water to nourish the plants. Each tier has an outlet 39 in the soil section to allow excess water to drain from the soil of one tier to a subjacent tier. Each tier has apertures 43 on the outer inclined wall to allow liquid overflow to drip onto a subjacent tier and overflow openings 45 to further allow excess water to drain to the subjacent tier through the centrally located tree.

U.S. Pat. No. 3,293,798, issued to Hugh A. Johnson, Sr. on Dec. 27, 1966, also shows a multi-tier planter. The '798 patent discloses a planter having a vertical tubular standard 28 centrally mounted in base tube 10. A number of disk-shaped trays are vertically stacked and are connected to a standard 28, for containing soil. Each tray has an inclined outer wall with perforations 46 to allow liquid to drip onto a lower tray. The vertically stacked trays provide a preferred area exposed to the sunlight and rain to allow soil to absorb water.

A self-irrigating display rack for plants is taught in U.S. Pat. No. 4,006,559 issued to Richard A. Carlyon, Jr., on Feb. 8, 1977. The display rack disclosed has a hollow vertical tube 14 mounted for rotation in a tub 12. Horizontal trays 18 are mounted on tube 14 which has apertures 20 and 22 to allow circulation of water inside tube 14 between the various vertical levels of the trays. Each tray has an inclined surface to display potted plants and drip holes 28 to drip excess water into subjacent tiers of trays.

U.S. Pat. No. 3,451,622 issued to Arthur Forney on June 24, 1969 shows a decorative fountain having two vertical posts each having a vertical array of planter trays. The fountain disclosed is composed of two upstanding vertical posts with a waterwheel rotating therebetween to decoratively display falling water. The posts in Forney pour water onto a vertical rotating impeller which drips water into vertically stacked trays. Each tray has a concentric circular array of holes allowing water to drip through each stack of the next subjacent teir.

Shown in U.S. Pat. No. 307,936 issued to G. W. Fry on Nov. 11, 1884, is a fruit and flower stand having a vertical post with several tiers of circular trays to display flowers and fruit mounted thereon. Water is fed to a centrally mounted tank on the top of the vertical stand and is sprayed on the display tiers by a mounted water sprayer F. This device provides a means to water plants and wet the fruit held in each tray to make it appear to be fresh and vital.

In U.S. Pat. No. 1,880,364 issued to N. V. Sestito on Oct. 4, 1932 is disclosed an ornamental marker for vertically displaying plants. In Sestito, a plurality of plant pots are set up for growing individual plants, each pot mounted on a branch of a display stand. Each display pot has an individual sprinkler to provide water to the plant and a drain pipe attached to each pot to siphon off excess water.

In U.S. Pat. No. 147,849 issued to T. Leslie on Feb. 24, 1874 is disclosed a decorative fountain, wherein individual flower pots are mounted to display flowers. In a cone-shaped flower stand, plants are planted in flower pots which are set in vertically stacked, circular tiers concentrically arrayed around a central post in a decreasing radius from the center of rotation of the planter. Each pot is located below an overflow from the tray immediately above it to allow it to receive overflow water from the above pot. A drain pipe H is provided at the bottom of each plant pot to collect some of the excess water from each pot and allow it to drain into a central pipe for disposal.

OBJECTS OF THE INVENTION

A main object of the invention is to provide novel and improved self-irrigating, multi-tiered planters which are simple in construction, provide automatic irrigation of plants contained therein, consume a small amount of ground space and are neat in appearance.

It is a further object of the invention to provide vertically-tiered, self-irrigating planters which are inexpensive to manufacture, durable in construction, and easy to maintain with a limited number of parts.

It is still a further object of the invention to provide multi-tiered, self-irrigating planters which include an apparatus to properly control the supply of water to the soil through containing the plants. Both of these features combine to allow the plants to be properly nourished and grow without interfering with each other and provide an increased crop yield per ground area.

It is a further object of the current invention to provide self-irrigating, multi-tiered planters which automatically distribute liquid fertilizer and water to plants.

It is a further object of the current invention to provide multi-tiered, self-irrigating planters having structures which provide ventilation to successive tiers of soil-containing trays.

It is a further object of the current invention to provide multi-tiered, self-irrigating planters which allow central circulation of air between adjacent tiers to soil-bearing trays containing growing plants.

The above objects are achieved by the invention which, in one embodiment, includes a pan-shaped base member and a centrally located, upstanding, tubular post member open at its lower end and secured to the base, and having a plurality of apertures in its side wall. A plurality of trays shaped as a V in rotation having a radial V cross section, contain an organic material, preferably soil, for growing and are vertically stacked on one another and are secured to the tubular post member in vertical alignment overlying the base member. Each tray has apertures on the lowest point of the tray to allow liquid to seep into a subjacent tray or into the base member. Each tray has a second series of apertures located in the outer inclined wall of each tray to provide an overflow outlet to allow excess liquid to drip into a lower subjacent tray or the base member. The planter has its water distribution means located above the uppermost tray and a means to feed liquid to the distribution means.

A preferred embodiment employs trays having an outer annular portion which contains organic soil for growing plants. An inner portion contains an inorganic material permeable to air and moisture for allowing their circulation. The trays in the preferred embodiment are not mounted to the central post, and the weight of each tray is supported by the lower trays. The central post allows air to communicate with the inorganic material for circulation.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the specific embodiment, when read in connection with the accompanying drawings, wherein like reference characters indicate like parts throughout the several figures, and in which:

FIG. 1 is a partial, cross sectional view and partial side view of the first embodiment of the invention;

FIG. 2 is a cross sectional view of an alternate water distribution means of the invention.

DETAILED DESCRIPTION OF THE DRAWINGS

Figure 3:
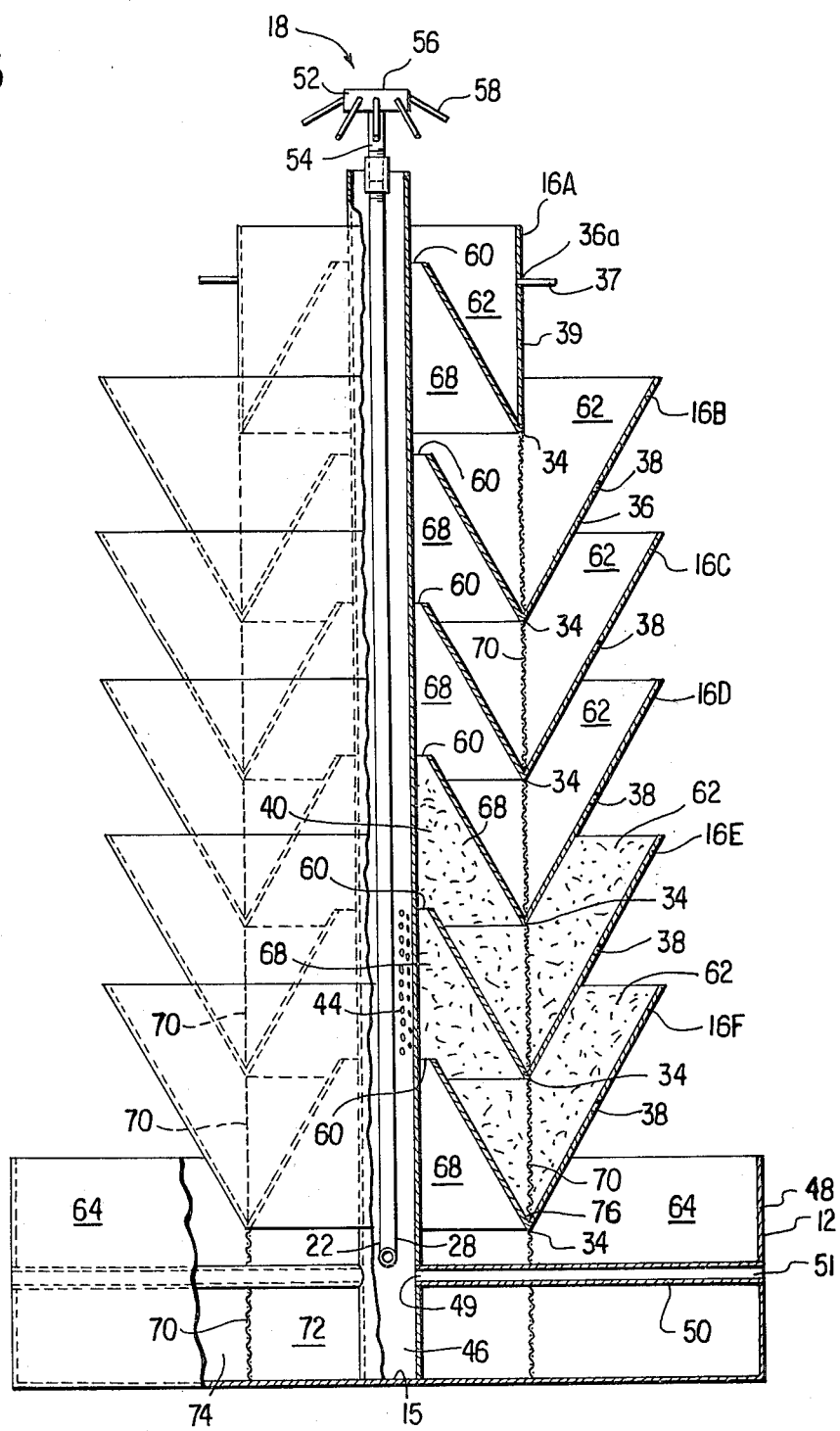
FIG. 3 is a partial cross section and partial side view of a preferred embodiment of the invention.

Referring now more particularly to FIG. 1, seen in partial, side cross section is a self-irrigating planter 10. Planter 10 has a pan-shaped base member 12 which is used to collect drippings from the planter. Centrally mounted in base member 12 is a central tubular post member 14 having a post base opening 15 to allow fluid passage into and out of post member 14. Post member 14 is vertically mounted and has a plurality of vertically stacked trays 16A-F concentrically mounted thereon and attached to the post member 14 by conventional means. Each tray 16 is shaped as a V in rotation and has a V shape in radial cross section. The trays 16 contain soil for growing plants as desired by the owner.

Mounted atop post member 14 is a liquid distribution means 18 which is used to distribute liquid to the plants growing in subjacent trays.

Coaxially located inside tubular post member 14 is a means to feed liquid to the water distribution means 18. In a preferred embodiment, means to feed liquid 20 is seen as a liquid pipe 22 coaxially mounted in the tubular post member 14.

In one embodiment, the planter distribution means 18 is a liquid distribution sprinkler 52 that is mounted on the top end of central tubular post member 14. The sprinkler 52 has a sprinkler inlet 54 connected to the means to feed liquid to receive liquid wavefrom. The liquid from the sprinker inlet 54 is forced into a distribution manifold 56 which distributes the incoming liquid to the liquid outlet 58. Liquid is then sprayed from outlets 58 down to the subject trays 16.

In the embodiment of the self-irrigating planter disclosed in FIG. 1, each vertically stacked tray 16 is shown as having two groups of apertures. At the crotch of the V, shown in FIG. 1, is drain aperture 34. Drain aperture 34 of 16B is concentrically centered over planter tray 16C and transmits water seeping through soil and plants in tray 16B to tray 16C. In this manner, the drain aperture 34 provides a constant supply of liquid to each subjacent tray 16B-F to promote growth of the plants therein.

Located on the tray outer inclined wall 36 of trays 16A-F is second aperture 38 which provides an overflow of liquid from a given planter tray 16 to a subjacent planter tray 16. The second aperture 38 overlies a portion of each subjacent tray 16 and distributes water to portions of the subjacent tray 16 a further radial distance from post member 14 than that supplied by crotch drain aperture 34. This distributes irrigating liquid throughout the tray to provide an ample water source to plants growing in tray 16 despite their radial distance from post member 14. Second aperture 38 insures that no given planter tray will be overflowed with liquid draining from distribution means 18 on top central tubular post member 14.

Tray 16A has overflow aperture 36a which is connected to a tube 37. Tray 16A has substantially vertical outer cylindrical walls 39 which define the outer boundaries of soil containing tray 16A. Cylindrical walls 39 are substantially vertical to provide maximum air space and exposure to sunlight to plants growing in tray 16B. Tray 16A is immediately subjacent of liquid distribution means 18 and is first to receive liquid. After nourishing plants in that tier the liquid drops through the soil to crotch drain aperture 34 to subjacent tray 16B. The liquid overflow is dripped through tube 37 which is radially extended over subjacent tray 16B to provide liquid to plants in the radially extended portions of the subjacent tray 16.

When the planter is assembled and vertically stacked trays 16 are suspended from tubular post member 14, the vertically stacked trays 16 are partially nested together and spaced apart along tubular post member 14 creating an annular space 40 between adjacent rows of vertically stacked trays. The presence of annular space 40 creates a surface 42 on the soil of each tray 16 adjacent the post member 14 which allows air to pass into the soil. The central tubular post member 14 has post apertures 44 extending through the side walls thereof which allow air to circulate through the coaxial hollow core 46 of post member 14 to provide a source of ambient air to surface 42 of each tier. Ambient air provides moisture and nutrients to the soil which is subsequently acquired by plants growing in each vertically stacked tray 16.

Apertures 44 in post member 14 also serve a separate and distinct purpose. They additionally serve as overflow outlets to allow overflow liquid from each tray to flow into the coaxial core 46 of post member 14, the post base opening 15 and into base member 12.

Radially arrayed in pan-shaped base member 12 between central tubular post member 14 and cylindrical side wall 48 are air tubes 50 which connect to the central tubular post member 14 at air intake apertures 49 and cylindrical side wall 48 at air tube inlets 51. Air tubes 50 are in communication with the outside atmosphere and provide air to pass up the coaxial core 46 of tubular post member 14 to be distributed to the annular space 40 between adjacent trays 16 through apertures 44.

In another embodiment, liquid distribution means 18 comprises a tub 24 coaxially mounted on the end of tubular post member 14. The tub 24 is generally cylindrical having vertical cylindrical walls 26 and a horizontal tub bottom 28 sealingly connected to the side walls 26. Concentrically located within tub 24 is an inner cylindrical mounting member 30 which mounts atop the end of central tubular post member 14 to support the tub 24 on post member 14. Side walls 26 and inner cylindrical mounting member 30 are sealingly connected to the tub bottom 28 to form a watertight seal therebetween. Tub bottom 28 has apertures 32 which are sized to meter liquid to the subjacent stack of planter trays 16. Mounting member 30 has an air permeable upper surface for allowing the air in tube 14 to maintain a vertical flow. The top of member 30 extends above the water level in tub 24 so that water does not flow into tube 14, except as an overflow outlet.

The planter may be easily assembled as follows. The base member is set in a sunny spot. Tubular post member 14 is vertically set in the center of base member 12 and connected to air tube 50. Means to feed liquid is connected to a source of liquid. Vertical trays 16 are then concentrically mounted on tubular post member 14 and vertically nested together. Liquid distribution means 18 is then mounted atop tubular post member 14 communicating with means to feed liquid. Soil and seed are then added to the vertical trays 60 and the planter is prepared to grow plants.

The planter operates as follows. The liquid source is turned on and the liquid is pumped through the means to feed liquid to the liquid distribution means 18. In one mode, the liquid distribution means 18 is a tub 24. Liquid accumulates in tub 24. If the liquid is water, fertilizer may be mixed in the water at this point.

The liquid is metered into subjacent tray 16A through tub apertures 32. After providing water and nutrients to the plants, excess liquid will seep through the soil, directed by the inclined walls of the tray 16A, to crotch drain apertures 34 from which the liquid will seep to the subjacent tray 16B.

Excess liquid will build up in the tray 16A until it flows out second aperture 36A and tube 37 to drop into the subjacent tray 16B radially outward of crotch drain apertures 34 or overflow into post apertures 44 to fall through coaxial core 46 to be collected in base member 12.

The liquid progresses down subjacent vertically stacked trays 16B-F until it falls into and is collected in base member 12.

A preferred embodiment of the invention is shown in FIG. 3. Many of the elements of the embodiment shown in FIG. 3 have been previously described above with respect to the embodiment of FIG. 1. Features which are the same have the same reference numerals as in FIG. 1.

The embodiment shown in FIG. 3 differs from that shown in FIG. 1 in several respects. First, the trays 16A-F are not mounted to the central member 14. Instead, each tray is supported by a lower tray, and the lowest tray 16F is supported by the base member. The bottom of tray 16F rests on the contents of the base member, and the bottom of each other tray rests on the contents of a next lower tray. Each tray has a circular portion 60 which is spaced from the tubular member 14.

Each tray contains organic and non-organic materials. The outer annular portions 62, of the trays 16B-F, and an outer portion 64 of the base member 48 contain organic soil which is capable of supporting plant growth. The inner portion 68 of the trays 16B-F contain a non-organic material, such as gravel or sand.

The combination of non-organic material and organic material allows the air to circulate from the central member 14 through the trays and into the surrounding atmosphere. The area 68 includes the entire area between the inner conical portions of adjacent trays. The non-organic soil preferably fills this area and thus there is a large area of contact with the surface of the tube 14. Air passes from the tube 14 through the non-organic material 68 and then through the organic material 62. This circulation of air, which is greater than that of prior art planters, prevents the soil from becoming sour. The planter may thus be used over a long period of time, such as a number of years, without replacing the soil.

The planter shown in FIG. 3 may be easily constructed with the use of screens 70. Cylindrical screens 70 fit in the crotch of the V of the trays 16B-F, and in base member 12. A screen 70 may be placed in the base member 12, and the portion 72 which is below the top of the screen is filled with non-organic material. A tray (16F) is then placed on the base member so that the bottom of the V rests on the non-organic material, and an additional amount of non-organic material is poured through the gap between the annular element 60 and the tube 14. This insures that the entire area 68 is filled with non-organic material. When assembling the trays, the screen 70 is placed in the crotch of the V, and the area 68 is filled to the top of the screen with non-organic material. An upper tray is then put in place and the remainder of the area 68 is filled with non-organic material. The areas 62 may then be filled with organic material. The base 12 also contains an annular non-organic portion 74 which lies below the organic portion 64.

Other methods of assembly, possibly not requiring screens 70 will be apparent to those of skill in the art.

Apertures 34 of the trays of the FIG. 3 embodiment also allow liquid to drain from an upper tray to a lower tray. These apertures may be covered with a filter 76 to prevent either the organic or the non-organic material from seeping out of the tray or clogging the apertures.

It may be seen that in the FIG. 3 embodiment the tube 14 serves primarily to allow the circulation of air, and is not a structural support member. This means that the trays are supported by their inner conical walls and may thus be of a thinner, or weaker, material which is less expensive than that required in prior designs.

Neck 60 is shown in FIG. 3 located above the level of the aperture 34. This arrangement allows the neck 60 to act as an overflow, by allowing an excess of water in the trays to be drained from pan to pan and eventually into the base member 48.

The drainage system of the FIG. 3 embodiment permits a continuous movement of water from the driplet 37 into pan 16B and from the apertures 34 and 38 into subjacent trays. Water eventually flows into base member 48 and may either evaporate or be drained off by an overflow outlet.

While preferred embodiments have been shown, other arrangements within the scope of the claims will be apparent to those of skill in the art.

What is claimed is:

1. A self-irrigating planter comprising:
   (a) a pan-shaped base member;

(b) an upstanding tubuar post member open at its lower end and vertically secured to the base, said post member being permeable to air and water;

(c) a plurality of trays in a vertical stack coaxial with said post member, each of said trays containing a medium, to at least a level which fills a lower tray to at least the bottom of a next higher tray, for growing plants and having an outer conical wall and an intersecting oppositely-directed inner conical wall and terminating in a circular portion concentric to said post wherein said medium permits the flow of air and moisture therethrough and said tray permits air and moisture to flow between said post member and the exterior of said planter;

(d) each of said trays having an aperture in said bottom to allow liquid to seep into a lower tray or said base member;

(e) a second aperture located in an outer wall portion of each tray to provide an outlet for excess liquid to seep to a lower adjacent tray; and (f) a liquid distribution means located above said post member.

2. The self-irrigating planter apparatus of claim 1 wherein said liquid distribution means comprises a substantially cylindrical liquid-collecting reservoir mounted on the top end of said post member substantially coaxially above said trays and having apertures in its lower horizontal surface to pass liquid to subjacent trays.

3. The self-irrigating planter of claim 1 wherein said liquid distribution means comprises a sprinkler means for distributing droplets onto said trays.

4. The self-irrigating planter of claim 1 wherein the topmost of said trays has a substantially vertical outer wall defining a radius from said center of rotation equal to approximately one-half the radius of subjacent trays.

5. The self-irrigating planter of claim 4 wherein vertically stacked trays define open spaces between vertically adjacent trays adjacent the post member.

6. The self-irrigating planter of claim 5 wherein there are air conducting conduits in said base member to conduct air from outside said base member through said tubular post member to open the space between adjacent trays.

7. The planter of claim 1 further comprising:
a distribution tray having a cylindrical outer wall and a conical inner wall, and located above an uppermost tray;
droplet means projecting outwardly from said outer wall of said distribution tray for allowing liquid in said distribution tray to flow into a subjacent first tray.

8. The planter of claim 7 wherein said inner conical wall is a truncated cone, and the uppermost portion of said inner wall is spaced from said central member.

9. The planter of claim 8 further comprising means extending through said post member for delivering water to said distribution tray.

10. The planter of claim 9 further comprising means above said one set of apertures for preventing flow of said organic or non-organic material through said one set of apertures.

11. The planter of claim 1 wherein said medium comprises a first portion and a second portion, said first portion being located in an outer part of at least one tray and said second portion being located inwardly of said first portion.

12. The planter of claim 11 wherein said first portion is soil and said second portion is selected from the group consisting of sand and gravel.

13. The planter of claim 12 wherein said second portion fills a space between an inner part of said lower tray and an inner part of said higher tray.

14. The planter of claim 11 further comprising cylindrical means for physically separating said first portion from said second portion without hindering the flow of air and moisture.

15. The planter of claim 11 wherein each said higher tray is supported by each said lower tray.

16. The planter of claim 15 wherein said circular portion is spaced from said post member and is higher than the bottom of the next higher tray.

* * * * *